United States Patent
Huber et al.

(10) Patent No.: US 11,472,463 B2
(45) Date of Patent: Oct. 18, 2022

(54) ADJUSTING DRIVE FOR A STEERING COLUMN AND STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Göfis (AT); Jean-Pierre Specht, Haag (CH); Arne Schacht, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/278,452

(22) PCT Filed: Oct. 14, 2019

(86) PCT No.: PCT/EP2019/077732
§ 371 (c)(1),
(2) Date: Mar. 22, 2021

(87) PCT Pub. No.: WO2020/078877
PCT Pub. Date: Apr. 23, 2020

(65) Prior Publication Data
US 2021/0362768 A1 Nov. 25, 2021

(30) Foreign Application Priority Data
Oct. 19, 2018 (DE) .................... 10 2018 217 960.3

(51) Int. Cl.
*B62D 1/181* (2006.01)
(52) U.S. Cl.
CPC .................. *B62D 1/181* (2013.01)

(58) Field of Classification Search
CPC ................ B62D 1/181; F16H 25/2003; F16H 2025/209; F16H 25/2015; F16H 25/24; F16H 2025/249
See application file for complete search history.

(56) References Cited

U.S. PATENT DOCUMENTS

| 3,813,718 A | 6/1974 | Kamiya |
| 2017/0015345 A1 | 1/2017 | Galehr |

(Continued)

FOREIGN PATENT DOCUMENTS

| CN | 106232455 A | 12/2016 |
| DE | 18 91 224 U | 4/1964 |

(Continued)

OTHER PUBLICATIONS

Din40400, German Standard, Electrical thread for D Fuses, Dec. 1981.

(Continued)

*Primary Examiner* — Drew J Brown
(74) *Attorney, Agent, or Firm* — thyssenkrupp North America, LLC (57) ABSTRACT

An adjusting drive for a steering column for a motor vehicle may include a threaded spindle that by way of an external thread engages in a spindle nut. The adjusting drive may also include a drive motor that is coupled to the threaded spindle or the spindle nut such that driving at least one of the threaded spindle or the spindle nut with the drive motor causes the threaded spindle and the spindle nut to rotate relative to one another. To reduce production complexity and improve functionality, the threaded spindle may have a core element that at least in portions is coaxially surrounded in a fixed manner by a threaded element that is configured from plastic and comprises the external thread.

20 Claims, 7 Drawing Sheets

(56) References Cited

U.S. PATENT DOCUMENTS

2017/0097071 A1    4/2017  Galehr
2018/0058553 A1*  3/2018  Kick-Rodenbuecher .................... F16H 25/2015

FOREIGN PATENT DOCUMENTS

| | | | | |
|---|---|---|---|---|
| DE | 201 03 040 U | 7/2001 | | |
| DE | 10 2014 103 879 A | 9/2015 | | |
| DE | 10 2015 224 602 A | 6/2017 | | |
| DE | 10 2017 207 561 A | 7/2017 | | |
| DE | 20 2018 1 04 386 U | 9/2018 | | |
| DE | 102018212202 A1 * | 1/2020 | ............. | B62D 1/181 |
| DE | 102019212435 A1 * | 2/2021 | ............. | B62D 1/181 |
| JP | 2009-248703 A | 10/2009 | | |
| KR | 20080105755 A * | 12/2008 | | |
| WO | WO-2021165218 A1 * | 8/2021 | | |

OTHER PUBLICATIONS

English Translation of International Search Report issued in PCT/EP2019/077732, dated Jan. 23, 2020.
DIN 40400 [in process of locating copy].

* cited by examiner

ADJUSTING DRIVE FOR A STEERING COLUMN AND STEERING COLUMN FOR A MOTOR VEHICLE

CROSS REFERENCE TO RELATED APPLICATIONS

This application is a U.S. National Stage Entry of International Patent Application Serial Number PCT/EP2019/077732, filed Oct. 14, 2019, which claims priority to German Patent Application No. DE 10 2018 217 960.3, filed Oct. 19, 2018, the entire contents of both of which are incorporated herein by reference.

FIELD

The present disclosure generally relates to steering columns, including adjusting drives for steering columns of motor vehicles.

BACKGROUND

Steering columns for motor vehicles have a steering shaft having a steering spindle, a steering wheel for introducing a steering command by the driver being attached to the rear end of said steering spindle that faces the driver in the driving direction. The steering spindle is mounted in an actuating unit so as to be rotatable about the longitudinal axis of said steering spindle, the actuating unit being held by a support unit on the vehicle body. A longitudinal adjustment can take place in that an inner casing tube of the actuating unit, also referred to as casing tube for short, is received in a casing unit so as to be displaceable in a telescopic manner in the direction of the longitudinal axis, said casing unit also being referred to as a guide box, an outer casing tube or a boxed swing arm, that is connected to the support unit. The height adjustment can be implemented in that the actuator unit, or a casing unit receiving the latter, is pivotably mounted on the support unit. The adjustment of the actuating unit in the length direction or height direction, respectively, enables an ergonomically comfortable steering position to be set relative to the position of the driver in the operating position, also referred to as the driving or operating position in which a manual steering intervention can take place.

In the prior art it is known for a motorized adjusting drive having a drive unit with a drive motor to be provided for adjusting the actuating unit relative to the support unit, said drive motor, typically by way of a gear mechanism, being connected to a spindle mechanism which comprises a threaded spindle which is screwed into a spindle nut. On account of the drive unit, the threaded spindle and the spindle nut can be driven so as to rotate in relation to one another about the threaded spindle axis, on account of which said threaded spindle and said threaded spindle nut can be moved in a translatory manner toward one another or away from one another, depending on the direction of rotation. In one embodiment, a so-called rotary spindle mechanism, the threaded spindle is able to be driven so as to rotate about the threaded spindle axis thereof, which by means of the coupling portion of the latter is connected so as to be stationary with the actuating unit or the support unit by the drive unit, the threaded spindle engaging in the spindle nut which in terms of rotating about the threaded spindle axis is attached so as to be stationary on the support unit or the actuating unit. In the direction of the threaded spindle axis, the threaded spindle by way of the coupling portion is supported on the support unit or the actuating unit, and the spindle nut is supported in an analogous manner on the actuating unit or the support unit, such that driving the threaded spindle in a rotating manner causes the support unit and the actuating unit to be adjusted relative to one another in a translatory manner. In an alternative embodiment which is referred to as an immersion spindle mechanism, the threaded spindle in terms of rotation about the threaded spindle axis thereof, by way of the coupling portion of said threaded spindle is coupled in a rotationally fixed manner to the support unit or the actuating unit, and the spindle nut in analogous manner is mounted so as to be rotatable on the actuating unit or the support unit but so as to be stationary in the direction of the threaded spindle axis. As is the case in the first embodiment, the threaded spindle in the direction of the threaded spindle axis is supported on the support unit or the actuating unit by way of the coupling portion, and the spindle nut in analogous manner is supported on the actuating unit or the support unit such that the threaded spindle by the drive unit is displaceable in a translatory manner in the direction of the threaded spindle axis. In both embodiments, the spindle mechanism forms a motorized adjusting drive which is effective between the support unit and the actuating unit and by way of which the actuating unit in order to be adjusted can be adjusted relative to the support unit.

In order for a longitudinal adjustment of the actuating unit in the direction of the longitudinal axis of the steering spindle to be implemented, a spindle mechanism of an adjusting drive can be disposed between the casing tube of the actuating unit and a casing unit which receives said casing tube so as to be longitudinally displaceable in an axial manner and which is connected to the support unit, and wherein the threaded spindle axis may be aligned so as to be substantially parallel to the longitudinal axis.

For the height adjustment, a spindle mechanism can be disposed between the support unit and an actuating unit which is mounted on said support unit so as to be pivotable in terms of height. A motorized longitudinal adjustment and height adjustment may be configured individually or in combination on a steering column.

With a view to a smooth-running adjustment with little play it is known in the prior art, for example from, DE 10 2017 207 561 A1, for the threaded spindle to be configured from plastics material. It is however disadvantageous herein that the production is complex because of the relatively massive design embodiment with a large material cross section required for sufficient load-bearing capability and time-intensive because of the long cooling time. Moreover, the long-term dimensional stability and sufficient durability of the plastic material can only be guaranteed to a limited extent given under the variable operating conditions in the motor vehicle.

Thus, a need exists for an improved adjusting drive for a steering column which requires less complexity in terms of construction and offers improved long-term functionality.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to adjusting drives for steering columns of motor vehicles. In some examples, an adjusting drive may comprise a threaded spindle which by way of an external thread engages in a spindle nut, and a drive motor which is coupled to the threaded spindle or the spindle nut in such a manner that the threaded spindle and the spindle nut are able to be driven so as to rotate relative to one another. Further, an example steering column for a motor vehicle may include at least one adjusting drive of this type.

According to the invention it is provided in an adjusting drive for a steering column for a motor vehicle, comprising a threaded spindle which by way of an external thread engages in a spindle nut, and a drive motor by which the threaded spindle is able to be driven so as to rotate relative to the spindle nut, that the threaded spindle has a core element which at least in portions is coaxially surrounded in a fixed manner by a threaded element which is configured from plastics material and comprises the external thread.

The core element forms a force-absorbing structure of the threaded spindle and for this purpose is configured from a material with a higher strength than plastics material. The core element is preferably composed of a metallic material, preferably of steel or an aluminum alloy. A sufficiently high load-bearing capability can be implemented in association with a relatively small material cross section, on account thereof.

The core element is configured so as to be elongate in the shape of a bar or a rod and can preferably have a cylindrical or prismatic basic shape, preferably having a smaller cross-section than the cross section of the external thread of the threaded spindle.

According to the invention, the core element in terms of the axial length thereof is at least in portions surrounded by the threaded element. The threaded element is fixedly and preferably non-releasably connected to the core element and, on account thereof, secured in terms of relative rotation in the circumferential direction as well as in terms of axial displacement in the longitudinal direction.

The threaded element supports the external thread which engages in, that is to say is screwed into, the corresponding internal thread of the spindle nut. The spindle nut, at least in the region of the internal thread, can be configured from a material of high-strength, preferably from a metallic material such as, for example, steel or a nonferrous metal such as brass or the like.

On account of the elastic deformability of the plastics material, the thread can be designed so as to have little play or no play. The plastics material surface of the external thread herein permanently enables positive slippage in the internal thread of the spindle nut, even when said internal thread is composed of a metallic material. On account thereof, the motorized adjustment can take place in a smooth-running and precise manner with little noise.

Heat which heats the spindle nut and the threaded spindle in the region of the spindle nut is created on account of friction in the thread during the adjustment. In order to avoid local overheating and, on account thereof, possible deterioration of the material properties of the plastic material which has relatively poor thermal conductivity, the heat has to be effectively dissipated from the plastics material body. On account of the threaded element according to the invention being configured on the threaded spindle, said threaded element is heated only when passing the spindle nut, that is to say when being screwed through the latter, and said threaded element by way of the longitudinal extent thereof outside the spindle nut can discharge the heat to the environment by radiation and convection, preferably by way of free convection.

Further effective cooling of the threaded spindle is enabled according to the invention in that the material of the core element has a higher thermal conductivity than the plastics material. For example, a metallic material usually has a thermal conductivity which is several times better than that of a plastics material. The core element by way of a correspondingly dimensioned material cross section can effectively discharge the amount of heat in the longitudinal extent of the threaded spindle, said heat having been introduced by way of the connection to the threaded element. The core element can thus serve as a cooling element or a thermal transmitter which avoids the threaded element being heated in a potentially damaging way even at a high thermal input on account of rapid adjustment and large adjustment paths. The long-term stability and operational reliability of the spindle mechanism is increased on account thereof.

For cooling, it is furthermore advantageous that the spindle nut comprises a metallic material, specifically at least in the region of the internal thread of said spindle nut. On account of the thermal conductivity which is higher in comparison to that of the plastics material, the accumulating heat can thus also be effectively externally discharged by way of the spindle nut.

The fact that the threaded element formed from plastics material can be effectively thermally de-stressed on account of the mechanisms described above is particularly relevant to steering columns having long adjustment path and/or high adjustment rates. This applies in particular to steering columns for an autonomous driving operation, said steering columns having a particularly great adjustment path in order to be adjusted from the operating position to a far removed stowage position outside the operating region, on the one hand, and having to achieve high adjustment rates, on the other hand, so as to be able to be rapidly moved to the operating position when required.

A long adjustment path is understood to be an adjustment path which is equal to or larger than 80 mm, that is to say that the thread length of the threaded element is thus equal to or larger than 80 mm.

The threaded element can be configured so as to be sleeve-shaped and be established on the core element. The threaded element can be provided as a separate threaded sleeve from plastics material, for example as an injection-molded plastic part. The latter on the external circumference thereof comprises the external thread and on the inside is connected in a rotationally fixed and axially fixed manner to the core element. The connection can preferably take place in a form-fitting and/or substance-to-substance bonded manner, by press-fitting, adhesive bonding, welding, or the like.

One preferred refinement provides that the threaded element on the core element is over molded by injection molding. The core element herein is over molded with the threaded element which is configured as an injection-molded plastic part. For this to be produced, a bar-shaped or rod-shaped core element which may be solid or hollow is incorporated in the thread-shaped molding cavity of an injection molding machine into which molten thermoplastic plastics material is injected. The threaded element is generated on account thereof and is simultaneously connected to the core element in a substance-to-substance bonded manner.

An advantage of the invention in the production by injection molding is also derived in that the core element according to the invention has a higher thermal conductivity than the threaded element. On account thereof, the plastics material melt can cool and solidify more rapidly, this enable an advantageous reduction in terms of the production time.

It can be provided that the core element has at least one form-fitting element that is connected in a form-fitting manner to the threaded element. The form-fitting element can comprise protrusions, depressions, structured surface features such as surface wrinkling, knurling, or the like, which engage with the threaded element. The form-fitting connection can be established in that the form-fitting element when being fastened to the core element is plastically molded into the separately provided threaded element. The form-fitting element can be embedded directly in the plastics material melt when the threaded element is overmolded by plastic injection molding, a particularly strong substance-to-substance and form-fitting connection being generated on account thereof.

One advantageous refinement provides that a gear wheel is at least partially configured conjointly with the threaded element. The threaded element can have a gear wheel, or at least parts thereof, for example a hub or a coaxial toothing, in which a drive wheel driven by a drive motor engages. On account thereof, the threaded spindle can be driven in a rotating manner so as to form a rotary spindle mechanism. The gear wheel can be entirely or partially configured, preferably from the plastics material of the threaded element, so as to be integral to the threaded element. In the injection-molding method, the gear wheel can be overmolded directly on the core element, preferably so as to be integral to the threaded element.

One advantageous embodiment of the invention provides that the threaded element has at least one preloading element which is elastically preloaded in relation to a thread turn of the spindle nut, preferably axially in relation to a tooth flank. The external thread of the threaded element has at least one helically encircling thread tooth having a tooth profile that is delimited by axial tooth flanks. The tooth profile herein from the inside engages in the corresponding thread turn in the internal thread of the spindle nut. A preloading element can be configured in the profile of the thread tooth and is directed from the tooth profile outward into the thread turn, transversely to the profile of the thread tooth. The preloading element herein is pressed onto the opposite tooth flank of the internal thread by way of a preloading force such that the thread tooth is effectively tensioned transversely to the helical extent of said thread tooth in the thread turn of the internal thread. The tooth flanks of the threaded element and of the spindle nut on account of the preloading force exerted by the preloading element can be tensioned in relation to one another such that thread play is no longer present. A smooth-running, low-vibration and precise adjustment results therefrom.

One advantageous refinement provides that the preloading element has at least one spring element which on the threaded element is configured so as to project, preferably axially project, in a thread turn of the external thread. The spring element is configured so as to be elastic in a manner transverse to the helical extent of the thread tooth and can preferably have a flexible tongue or a flexible leaf which radially projects from the threaded element. When engaging in the spindle nut, the spring element resiliently comes in contact with a tooth flank, or else both tooth flanks, of a thread turn of the internal thread of the spindle nut. On account thereof, the threaded spindle can be elastically preloaded without play in the internal thread of the spindle nut.

The diameter of the threaded element in the portion of the preloading element is preferably smaller than or equal to the thread nominal diameter, thus the envelope circle diameter of the threaded element in the region of the external thread.

One or a plurality of preloading elements can preferably be configured so as to be integral to the plastics material body of the threaded element, for example as integral elements of an injection-molded plastic part.

It is advantageous that the core element is configured so as to be tubular at least in portions. Weight can be saved on account of the core element being configured as a tubular hollow body, preferably so as to be hollow cylindrical. Moreover, heat can be effectively discharged from the threaded spindle during the production by plastic injection molding as well as during the adjusting operation in that a flow of a cooling medium passes through at least part of the hollow body. A hollow core element is preferably made from a metallic material, for example as a steel tube.

A hollow core element furthermore offers the advantageous potential for the core element to have as a deformation portion which is compressed transversely to the longitudinal extent of said core element and in which a coupling portion is configured.

The coupling portion can be formed by a deformation portion, also referred to as a pressed portion, in which a tubular portion is plastically compressed so as to be flat transversely to the axis.

The core element at least in portions can preferably have a corrugated tubular portion.

The corrugated tubular portion can have convex and concave portions which are disposed in an alternating manner. In other words, alternating encircling grooves and encircling protrusions form the corrugated tubular portion. The encircling grooves and the encircling protrusions are encircling in the circumferential direction in terms of the threaded spindle axis.

Alternatively, at least one helically encircling groove and/or one helically encircling protrusion can form the corrugated tubular portion.

Such grooves and protrusions can be formed in a circular-cylindrical tube by a metal spinning process.

The hollow-cylindrical core element can preferably be initially provided as a circular-cylindrical tubular portion without any preliminary deformations, for example by a piece of semi-finished product which is cut to a defined length. Alternatively, it is conceivable that the hollow-cylindrical tubular portion has a polygonal cross-section and is configured, for example, as a quadrangular, hexagonal or octagonal tube or the like (polygonal). On account of the tubular, hollow core element being plastically compressed in a deformation or pressing direction, respectively, which is transverse to the axial direction in such a manner, until internal regions of the tube wall which in terms of the axis are mutually opposite contact one another and are plastically pressed flat against one another, a deformation or pressed portion which is shaped substantially as a flat tab is generated. The now planar portions of the previous tube wall which in this flat compressed state lie against one another extend so as to be parallel to a plane, the so-called pressing plane, which is parallel to the axis. A flat solid cross section is formed herein, the thickness thereof, when measured in the deformation direction, thus in the normal to the pressing plane, preferably being equivalent to substantially double the wall thickness of the tube wall of the core element. However, it is also possible for the pressing portion to be further deformed beyond being compressed so as to be flat, that is to say to be further plastically compressed such that the thickness of the coupling portion is smaller than double the wall thickness of the non-deformed core element.

The basic shape of the coupling portion can be implemented by a simple step of plastic deformation, preferably by cold forming, specifically the planar, flat compression of hollow or tubular material, respectively. The energy required for forming herein is significantly less than when shaping the coupling portion and concavely molding the receptacle opening by means of massive forming from a solid material, for example a portion of a bar. The forming tools for compressing can be implemented using simple, planar pressing jaws, this requiring significantly less complexity than individually shaped dies for massive forming. The adaptation to the connection by way of a threaded spindle can take place in a simple manner by selecting the raw material which may be made available as a standard product, in particular also of different materials such as steel, stainless steel, nonferrous metal or the like. The processing of different materials according to the invention is likewise readily possible because only one relatively simple forming operation is required for generating the pressed portion by compressing.

A continuous transverse articulation opening for receiving an articulation pin or the like for connecting to a steering column can be incorporated in the coupling portion and alternatively or additionally have further fastening elements. Links of this type are in principle known in the prior art.

It can furthermore be provided that the threaded spindle has an internal thread. A further threaded spindle can be screwed into the internal thread, on account of which a multi-stage telescopic threaded mechanism can be provided. The internal thread herein forms the spindle nut for the further threaded spindle which when being screwed into the tubular threaded spindle according to the invention can be immersed axially in the latter.

The internal thread can be configured in the core element or in the threaded element. The internal thread can be molded so as to be integral in the metallic core element, the latter being preferably made of steel. The core element, on account thereof, permits effective cooling of a further threaded spindle which is screwed in and can have a thread formed from plastic material, for example having a threaded element according to the invention. Alternatively, the threaded element can comprise the internal thread which by plastic injection molding can be generated so as to be integral to the threaded element. The internal thread herein can be disposed in a portion of the threaded element which from the end-side opening extends into the cross section of the tube.

It can be provided that the core element or the threaded element has a detent element. A detent element can comprise, for example, a protrusion which projects radially beyond the thread, for example an externally configured collar which cannot be screwed through the spindle nut and, on account thereof, forms an axial terminal detent for the translatory movement of the threaded spindle relative to the spindle nut. The detent element can be configured on the core element, for example by plastically enlarging or concavely molding the wall of a tubular core element. Alternatively or additionally, an axial detent can be implemented by suitably shaping an injection-molded plastic part.

It can be advantageous for the external thread to have lubricant pockets. Lubricant pockets serve as reservoirs for a lubricant, for example lubricating grease, and have one or a plurality of depressions or concave moldings in the region of the threaded profile. Said lubricant pockets are filled with lubricant during assembling, said lubricant ensuring long-term reliable lubrication of the thread during operation.

Another subject matter of the invention is a steering column for a motor vehicle, having a support unit which is able to be attached to a vehicle body and by way of which an actuating unit in which a steering spindle is rotatably mounted is held, and having an adjusting drive which comprises a threaded spindle which by way of an external thread engages in a spindle nut, and a drive motor which is coupled to the threaded spindle or the spindle nut in such a manner that the threaded spindle and the spindle nut are able to be driven so as to rotate relative to one another, wherein the adjusting drive has at least one coupling portion which is connected to the support unit or the actuating unit, wherein the threaded spindle is configured according to one of the embodiments described above. The coupling portion can preferably be configured on a threaded spindle.

The invention furthermore comprises a method for producing an adjusting drive which comprises a threaded spindle which by way of an external thread engages in a spindle nut, and a drive motor which is coupled to the threaded spindle or the spindle nut in such a manner that the threaded spindle and the spindle nut are able to be driven so as to rotate relative to one another, wherein the threaded spindle has at least one coupling portion, said method comprising the following steps:

providing a core element;
attaching a threaded element from plastics material to the core element so as to form a threaded spindle;
screwing the threaded spindle into the spindle nut.

The core element can be configured as has been described above for the embodiments of the adjusting drive. The threaded element can likewise be configured in an analogous manner. The manufacturing is preferably by plastic injection molding in which the core element is placed in a molding cavity of an injection molding machine and over molded with molten plastics material, wherein the threaded element is simultaneously configured from the plastics material and a connection to the core element is established. A gear wheel, an internal thread and/or a detent element can advantageously be configured conjointly with the external thread so as to be integral in the injection-molded plastic part.

Figure 1:
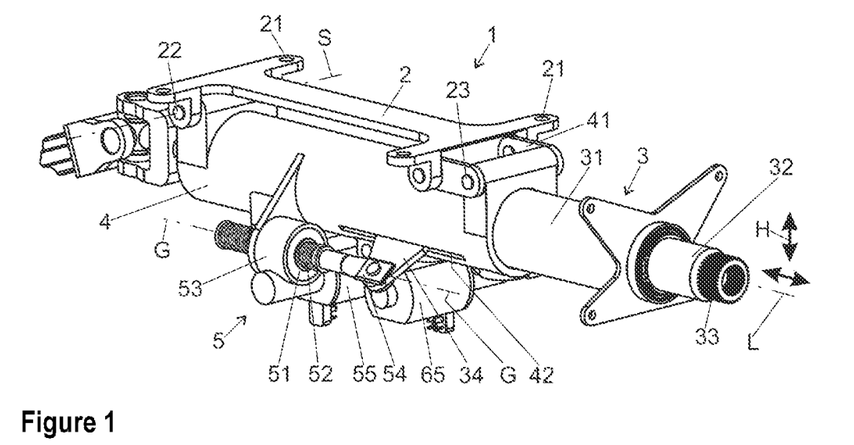
FIG. 1 is a schematic perspective view of an example steering column.
Figure 2:
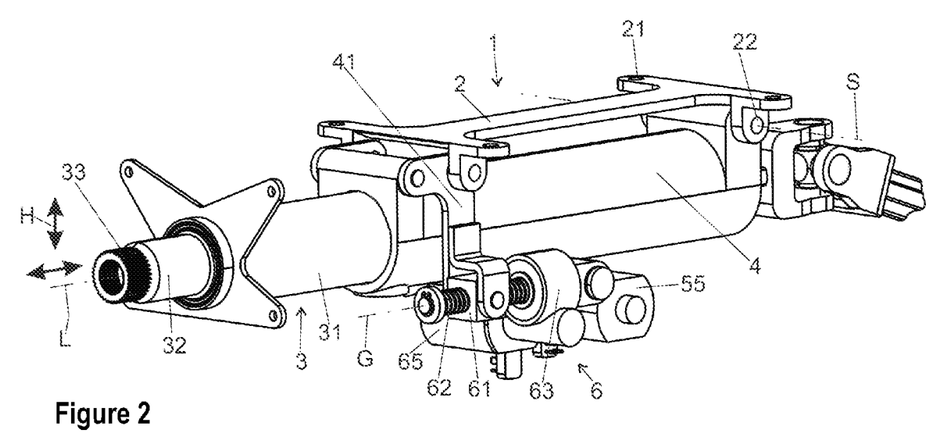
FIG. 2 is another perspective view of the steering column according to FIG. 1.

FIG. 1 shows a steering column 1 according to the invention in a schematic perspective view from top right obliquely onto the rear end in terms of the travel direction of a vehicle not illustrated, where a steering wheel not illustrated here is held in the operating region. FIG. 2 shows the steering column 1 in a view from the opposite side, thus seen from top right.

The steering column 1 comprises a support unit 2 which is configured as a console which has fastening means 21 in the form of fastening bores for attaching to a vehicle body not illustrated. An actuating unit 3 which is received in a casing unit 4, also referred to as a guide box or a boxed swing arm, is held by the support unit 2.

The actuating unit 3 has a casing tube 31 in which a steering spindle 32 is mounted so as to be rotatable about a longitudinal axis L which extends axially in the longitudinal direction, that is to say in the direction of the longitudinal axis L. A fastening portion 33 to which a steering wheel not illustrated is able to be attached is configured at the rear end on the steering spindle 32.

The actuating unit 3 for implementing a longitudinal adjustment is received in the casing unit 4 so as to be telescopically displaceable in the direction of the longitudinal axis L, in order to be able to position the steering wheel relative to the support unit 2 forward and backward in the longitudinal direction, said steering wheel being connected to the steering spindle 32, as is indicated by the double arrow parallel to the longitudinal axis L.

The casing unit 4 is mounted in a pivot bearing 22 on the support unit 2 so as to be pivotable about a horizontal pivot axis S which is transverse to the longitudinal axis L. In the rear region, the casing unit 4 is connected to the support unit 2 by way of an actuating lever 41. By way of a rotating movement of the actuating lever 41 by means of an illustrated actuating drive 6 (see FIG. 2), the casing unit 4 can be pivoted relative to the support unit 2 about the pivot axis S which in the installed state is horizontal, on account of which an adjustment of a steering wheel which is attached to the fastening portion 33 can be performed in the height direction H, this being indicated by the double arrow.

A first adjusting drive 5 for longitudinally adjusting the actuating unit 3 relative to the casing unit 4 in the direction of the longitudinal axis L has a spindle mechanism having a spindle nut 51 having an internal thread 74 which extends along an axis G and in which a threaded spindle 52 engages, the latter by way of the external thread thereof thus being screwed into the corresponding internal thread 74 of the spindle nut 51. The threaded spindle axis of the threaded spindle 52 is identical to the axis G and runs so as to be substantially parallel to the longitudinal axis L.

The spindle nut 51 is mounted in a bearing housing 53 so as to be rotatable about the axis G, said bearing housing 53 being fixedly connected to the casing unit 4. In the direction of the axis G, the spindle nut 51 is axially supported on the casing unit 4 by way of the bearing housing 53. Accordingly, the adjusting drive 5 is a so-called immersion spindle drive.

The threaded spindle 52 by way of a fastening element 54 configured on the rear end of said threaded spindle 52 is connected to the actuating unit 3 by way of a transmission element 34, specifically fixedly connected in the direction of the axis G, or the longitudinal axis L, respectively, and connected so as to be stationary in terms of the rotation about the axis G. A so-called immersion spindle drive is implemented on account of the spindle nut 51 being able to be driven in a rotating manner and the threaded spindle 52 which is stationary in terms of rotation.

The transmission element 34 extends from the actuating unit 3 through a slot-shaped passage opening 42 in the casing unit 4. For adjusting the steering column 1 in the longitudinal direction, the transmission element 34 can be freely moved along in the longitudinal direction in the passage opening 42.

The adjusting drive 5 has an electric drive motor 55 by way of which the spindle nut 51 in terms of the axis G is able to be driven so as to rotate relative to the stationary threaded spindle 52. Depending on the rotating direction of the drive motor 55, the threaded spindle 52 on account thereof can be repositioned in a translatory manner relative to the spindle nut 51 in the direction of the axis G such that the actuating installation 3 which is connected to the threaded spindle 52 is correspondingly adjusted in the direction of the longitudinal axis L relative to the casing unit 4 which is connected to the spindle nut 51. The drive of the spindle nut 51 and the support of the spindle nut 51 in the direction of the axis G on the casing unit 4 will be explained in detail hereunder.

It can be seen in FIG. 2, which shows a perspective view of the steering column 1 from that side which is at the rear in FIG. 1, how a second adjusting drive 6 for the adjustment in the height direction H is attached to the steering column 1. This adjusting drive 6 comprises a spindle nut 61, a threaded spindle 52 engaging in the internal thread 74 along an axis G of said spindle nut 61. The threaded spindle 52 is mounted in a bearing housing 63 which is fastened to the casing unit 4 so as to be rotatable about the axis G and is supported axially, in the direction of the axis G, on the casing unit 4, and is able to be driven so as to rotate, selectively in both directions of rotations, about the axis G by an electric drive motor 65. Accordingly, the adjusting drive 6 is a so-called rotary spindle drive.

The spindle nut 61 which may be formed from plastics material or from a nonferrous metal such as brass or the like, in terms of rotation about the axis G is attached so as to be stationary on an end of the twin-armed actuating lever 41 which is mounted on the support unit 22 so as to be rotatable about a pivot bearing 23, the other arm of said actuating lever 41 by way of the other end being connected to the casing unit 4.

Depending on the direction of rotation of the drive motor 65, the spindle nut 61 by rotating the threaded spindle 61 can be repositioned in a translatory manner in the direction of the axis G relative to the threaded spindle 52 such that the casing unit 4, which by way of the actuating lever 41 is connected to the spindle nut 41, including the actuating installation 3 received therein, can accordingly be adjusted up or down in the height direction H relative to the support unit 2, as is indicated by the double arrow. The drive of the threaded spindle 52 and the support of the threaded spindle 52 in the direction of the axis G on the casing unit 4 will be explained in more detail hereunder.

Figure 3:
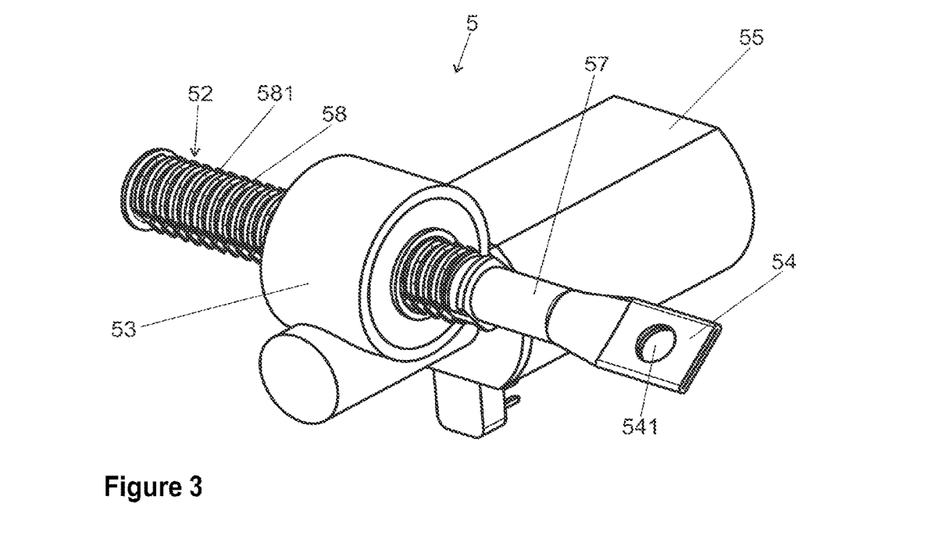
FIG. 3 is a schematic perspective view of an example adjusting drive.
Figure 4:
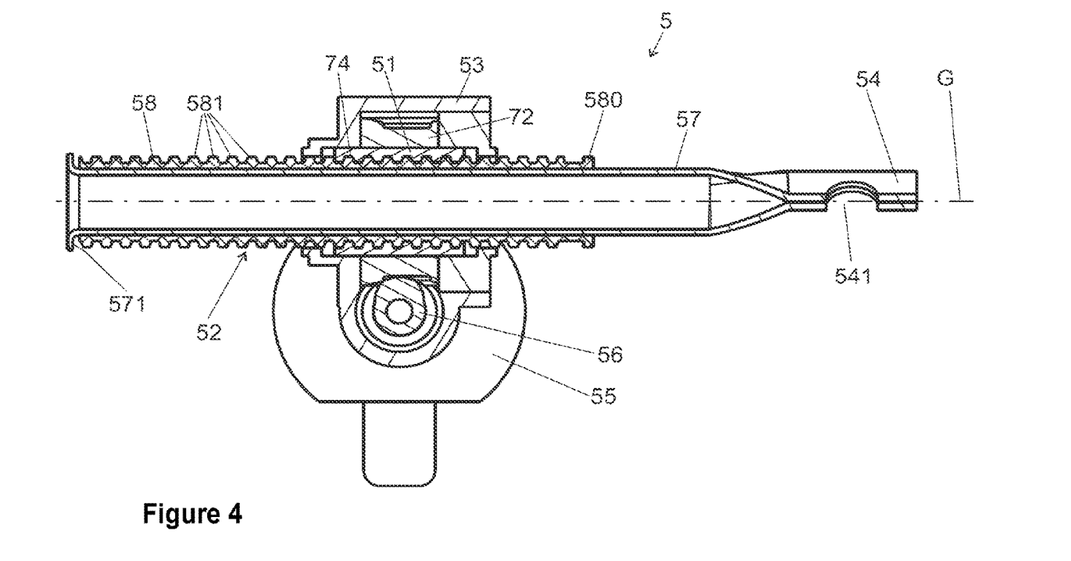
FIG. 4 is a longitudinal sectional view through the adjusting drive according to FIG. 3, along a threaded spindle axis.

FIGS. 3 and 4 show the adjusting drive 5 configured as an immersion spindle drive in a stand-alone illustration.

The threaded spindle 52 according to the invention has a tubular, hollow-cylindrical core element 57, preferably from steel tubing, to which a threaded element 58 is non-releasably attached in a coaxial manner, said threaded element 58 having the external thread with a helically encircling thread tooth 581 and being potentially over molded by plastic injection molding.

In order for the fastening element 54 which serves as a coupling element to be formed, the tube of the core element 57, preferably by cold forming, is compressed transversely to the threaded spindle axis so as to be flat and perpendicularly to the compression has a continuous fastening bore 541. A fastening pin 542 for connecting in a rotationally fixed manner to the transmission element 34 is passed through this fastening bore 541, as can be seen in FIG. 1.

The threaded spindle 52 is screwed into a spindle nut 51 which is rotatable in the bearing housing 53 but fixedly supported therein in the direction of the threaded spindle axis G. The spindle nut 51 is configured as a gear wheel and on the external circumference thereof has a toothing 72, specifically a worm toothing. A worm 56 which meshes with a toothing such that the spindle nut 51 is able to be driven so as to rotate relative to the threaded spindle 52 is connected to the motor shaft of the drive motor 55.

The core element 57 at the end facing away from the fastening element 54 has a detent element 571 which is configured as a radially outward projecting encircling collar, preferably by enlarging the tubular core element 57 by cold forming.

The threaded element 58 at the end thereof that faces the fastening element 54 likewise has a detent element 580 which is configured as an encircling protrusion or collar and which by plastic injection molding is configured so as to be integral to the threaded element 58.

The detent elements 571 and 580 form axial detents which cannot be screwed through the spindle nut 51 and thus delimit the adjustment path.

Figure 5:
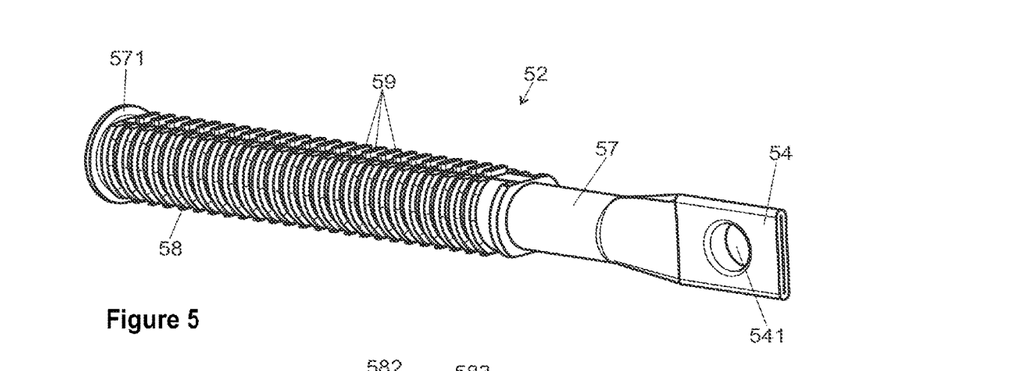
FIG. 5 is a perspective view of an example threaded spindle.
Figure 6:
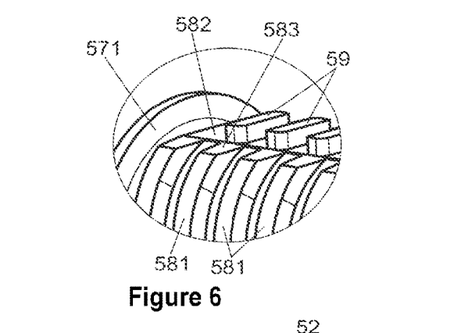
FIG. 6 is a detail view of an external thread of the threaded spindle according to FIG. 5.
Figure 7:
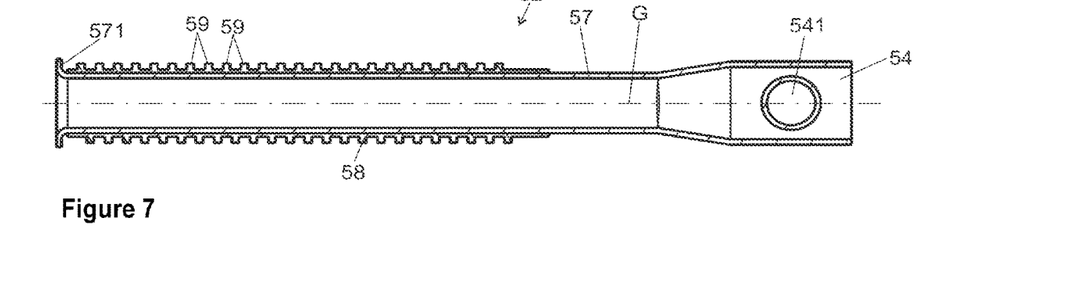
FIG. 7 is a longitudinal sectional view through the threaded spindle according to FIG. 5.

FIG. 5 shows the threaded spindle 52 in a perspective stand-alone view. The threaded element 58 has an axially continuous flattening 582 which can be clearly seen in the enlarged fragment of FIG. 6. The thread tooth 581 in each turn has a gap in the region of this flattening 582, one preloading element 59 being in each case configured in said gap. The preloading elements 59 in the first embodiment of FIG. 6 are configured as radially projecting pads or blocks which in the axial direction may be slightly wider than the encircling cross section of the thread tooth 58. The preloading elements 59 can likewise preferably be configured by plastic injection molding so as to be integral to the threaded element 58. On account of the elastic deformation of the plastics material, the preloading elements 59 can be preloaded or tensioned, respectively, without play in a resilient manner in the thread turn of the internal thread of the spindle nut 51.

Gaps which are concavely molded in an integral manner in the injection-molded plastic part and serve as lubricant pockets 583 are present between the exposed preloading elements 59 and the windings of the thread tooth 581.

Figure 10:
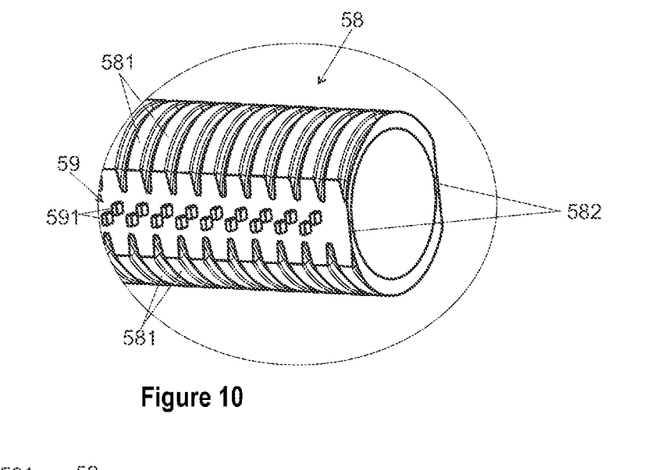
FIG. 10 is a detail view of another example external thread.
Figure 11:
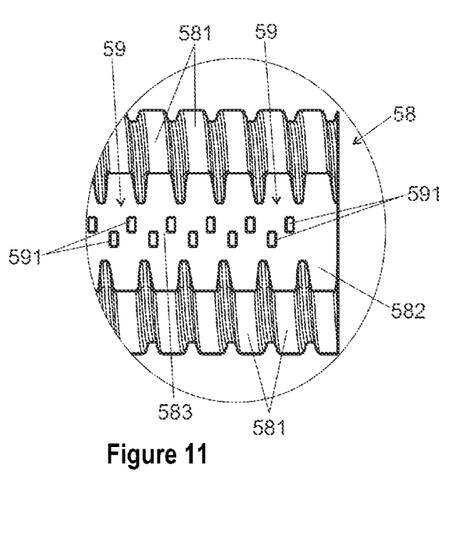
FIG. 11 is a radial view of the detail view of FIG. 10.
Figure 12:
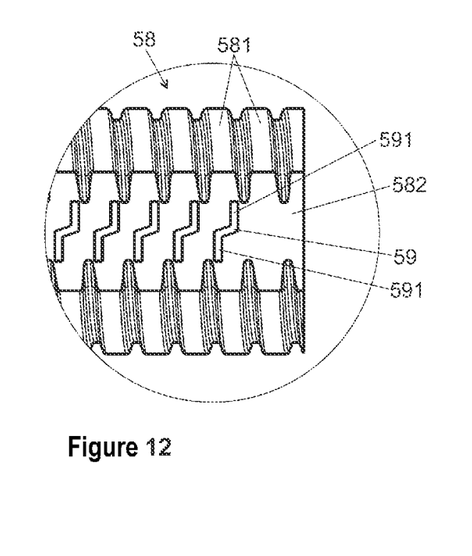
FIG. 12 is a radial view of yet another example external thread.

Further variants of preloading elements 59 are illustrated in FIGS. 10 and 11 as well as 12. The threaded element again has at least one, preferably two, mutually opposite flattenings 582 in which the thread tooth 581 has a gap in the circumference. In the second embodiment of FIGS. 10 and 11, each preloading element 59 has two radially projecting leaf-shaped or finger-shaped spring elements 591 which are spaced apart axially in the direction of the threaded spindle axis G and in the circumferential direction. Said spring elements 591 are elastically flexural in the axial direction and in the non-deformed state axially project slightly beyond the cross section of the thread tooth 581. On account thereof, said spring elements 591 in the screwed-in state in a thread turn are in each case tensioned between the thread flanks in the internal thread of the spindle nut 51.

The embodiment shown in FIG. 12 in a view as in FIG. 11 is of similar configuration, wherein each spring element 591 is configured as a Z-shaped spring leaf in that the spring elements which in FIG. 11 are in pairs are integrally combined.

All of the embodiments of spring elements 591 by plastic injection molding can be configured so as to be integral on the threaded element 58. The elasticity and the spring force exerted for preloading can be adapted and predefined according to requirements by way of the dimensions of said spring elements 591.

The available space between the spring elements 591 can be used as a lubricant pocket 583.

Figure 8:
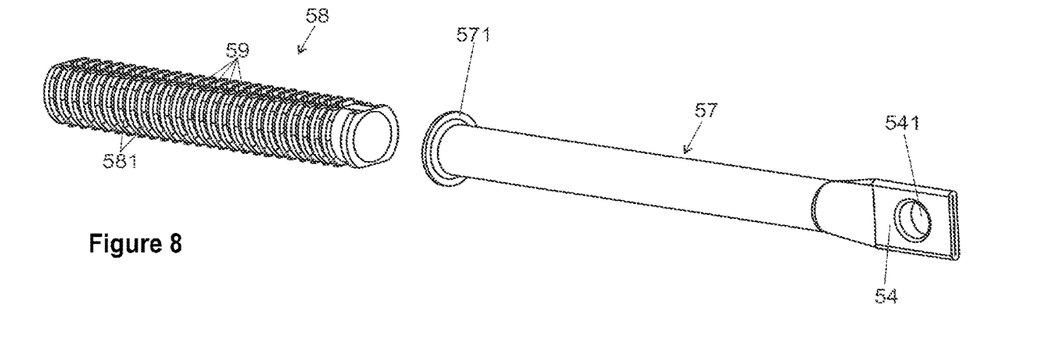
FIG. 8 is a schematically exploded view of the threaded spindle according to FIG. 5.
Figure 9:
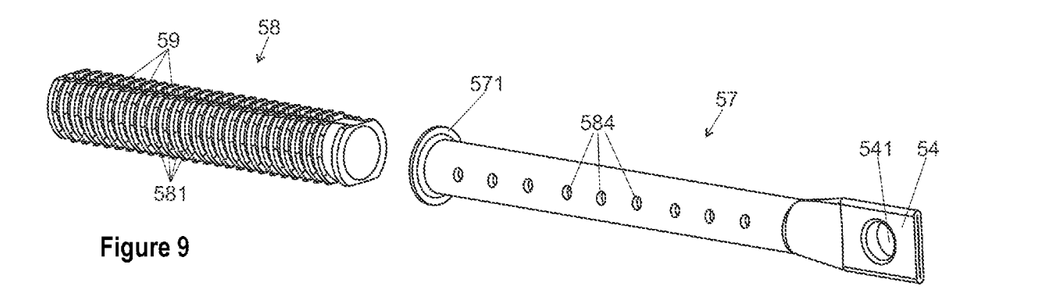
FIG. 9 is a schematically exploded perspective view of another example threaded spindle.

FIGS. 8 and 9 schematically show the core element 57 and the threaded element 58 in an axially exploded illustration. While the tubular region in which the threaded element 58 is situated in the assembled state in FIG. 8 is configured so as to be cylindrical with a smooth surface, said tubular region in the embodiment according to FIG. 9 has form-fitting elements 584 which may be configured as concave moldings such as grooves, cutouts or protrusions and which are embedded in the plastics material during overmolding and generate a connection which is form-fitting in the axial direction and the circumferential direction.

Figure 13:
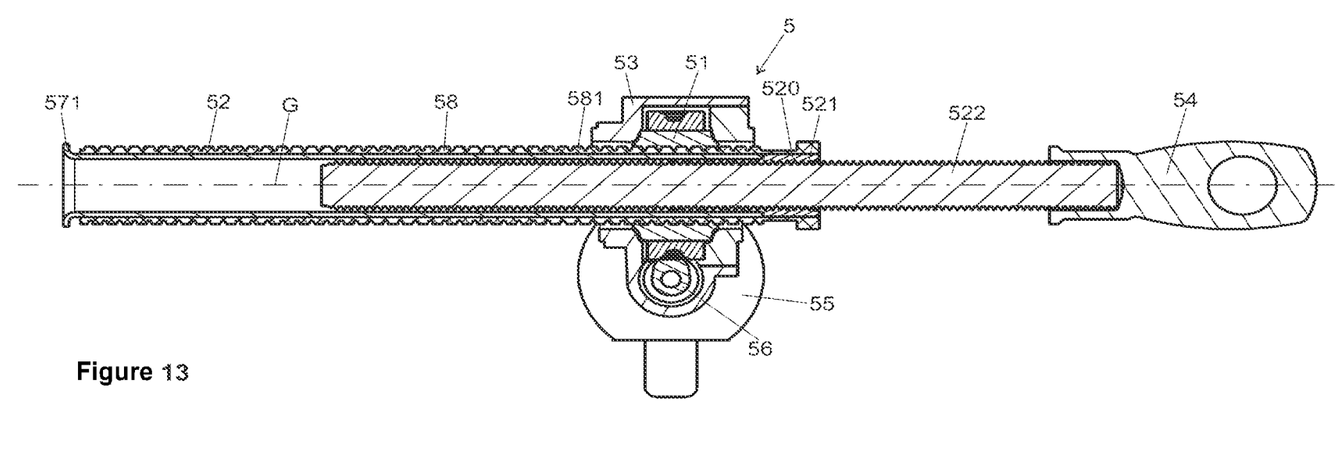
FIG. 13 is a longitudinal sectional view through another example adjusting drive.
Figure 14:
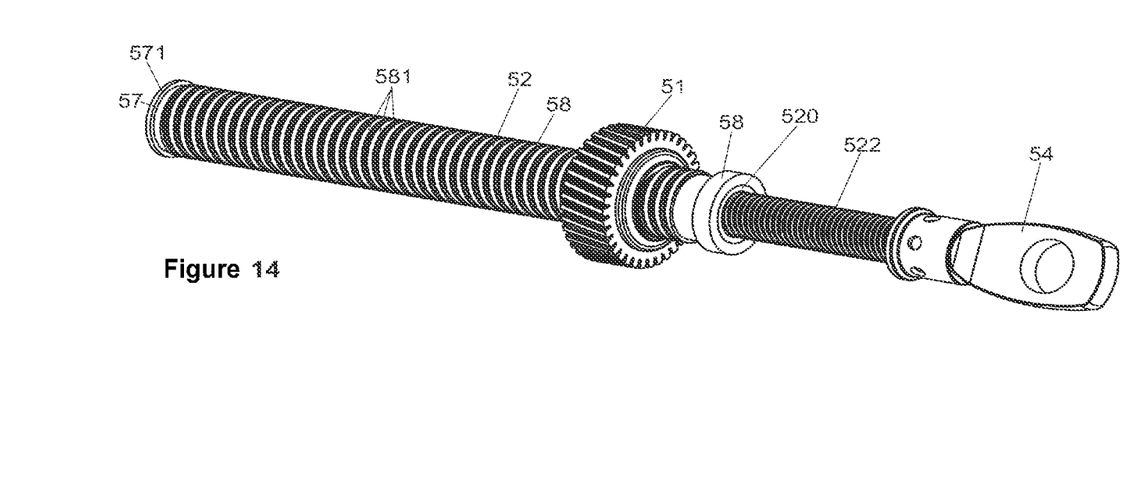
FIG. 14 is a perspective view of a spindle drive of the adjusting drive according to FIG. 13.

FIGS. 13 and 14 show a refinement of an immersion spindle mechanism in which the threaded spindle 52 does not have the fastening element but an internal thread 521 into which a second threaded spindle 522 is screwed, said second threaded spindle 522 at the free end thereof being connected to the fastening element 54.

The internal thread 521 can be configured in a threaded bush 520 which is inserted into the core element 57 and/or connected to the threaded element 58, for example by the overmolding described above. It is likewise conceivable and possible for the internal thread 521 to be concavely molded by plastic injection molding so as to be integral in the threaded element 58.

Figure 15:
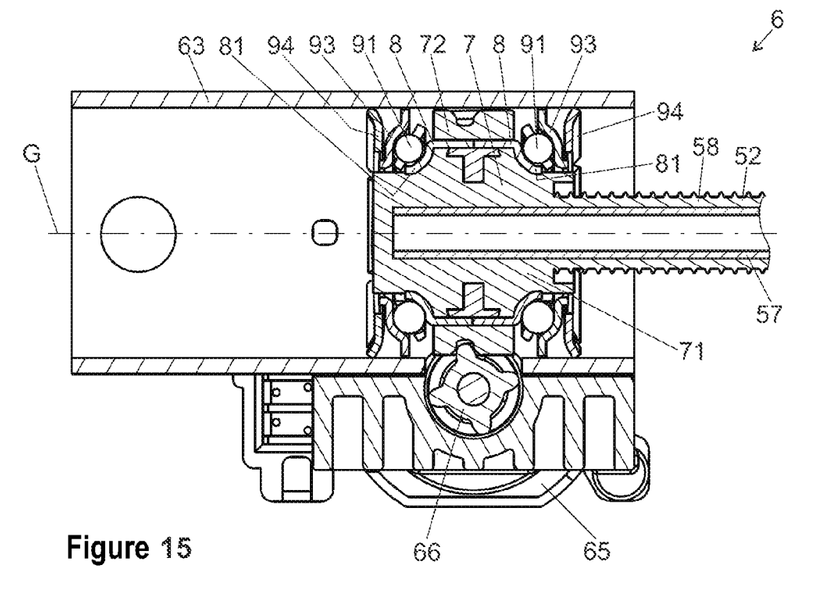
FIG. 15 is a longitudinal sectional view through still another example adjusting drive.
Figure 16:
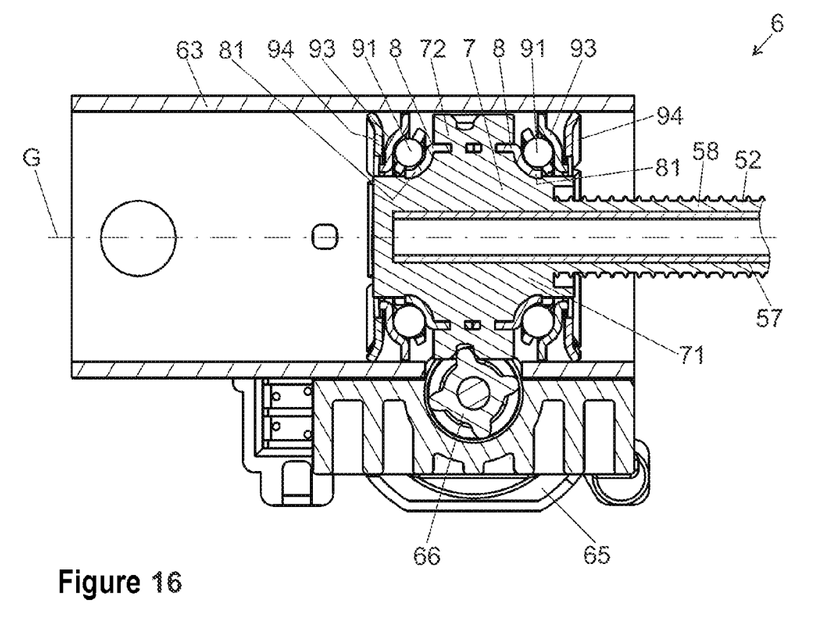
FIG. 16 is a longitudinal sectional view through yet a further example adjusting drive.

FIG. 15 and FIG. 16 illustrate a longitudinal section through the bearing housing 62 of the adjusting drive 6 along the axis G in different variants of embodiment. In this construction mode of the rotary spindle drive the threaded spindle 52 rather than the spindle nut is rotatingly driven by the drive motor.

A gear wheel 7 which is designed so as to be rotationally fixed in terms of the threaded spindle axis G is fastened to the threaded spindle 52. The gear wheel 7 by injection molding is at least partially made from plastics material so as to be integral to the threaded element 58 and has a hub element 71. The gear wheel 7 on the external circumference thereof has a toothing 72 which coaxially encircles the axis G and in the example illustrated is configured as a worm toothing such that the gear wheel 7 forms a worm gear. A worm 66 which is able to be rotatingly driven by the drive motor 65 engages in the toothing 72.

In the embodiment of FIG. 15, the hub element 71 by plastic injection molding is configured so as to be integral to the threaded element 58.

Bearing rings 8 are fixedly connected to the hub element 71. Each bearing ring 8 has an annular bearing face 81 which is configured as a ball race and is coaxial with the axis G. The two bearing faces 81, when viewed from the hub element 71, at the end sides converge conically toward the outside. In other words, the ball races are oblique in relation to the axis G.

The bearing rings 8 have support portions 82 which are axially directed toward one another in the direction of the axis G and in the example shown lie directly against one another such that the bearing rings 8 are directly supported on one another in the direction of the axis G.

The bearing rings 8 are preferably configured as formed sheet-metal parts, particularly preferably as stamped/punched parts from steel sheet. In order to be connected to the gear wheel 7, the bearing rings 8 are overmolded with the plastics material of the threaded element 58 and, with the exception of the bearing faces 81 which at the end sides are externally exposed, are embedded in a substance-to-substance bonded and form-fitting manner in the hub element 71.

The bearing faces 81 form the inner rings of a roller bearing assembly which comprises balls 91 which are rotatably held in a ball cage 92 and are disposed so as to be able to roll in the axial bearing gap between said ball races of the bearing faces 81 and the corresponding ball races in the outer bearing rings 93. The outer bearing rings 93, when viewed from the gear wheel 7, are axially supported in relation to the outside on counter bearings 94 at both end sides.

In the embodiment according to FIG. 16, the gear wheel 7 including the hub element 71 and the toothing 72 is made from plastics material by injection molding so as to be integral to the threaded element 58.

Figure 17:
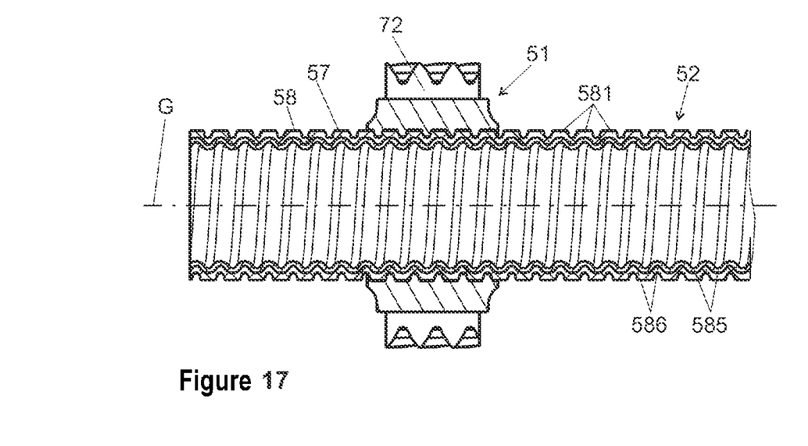
FIG. 17 is a longitudinal sectional view through a threaded spindle and a spindle nut of another example adjusting drive.

A longitudinal section through a threaded spindle 52 and a spindle nut 51 in a fourth embodiment is illustrated in FIG. 17. The threaded spindle 52 according to the invention has a hollow corrugated core element 57, preferably of steel, on which a threaded element 58 is non-releasably attached in a coaxial manner, said threaded element 58 having the external thread having a helically encircling thread tooth 581 and potentially being overmolded by plastic injection molding.

It can be readily seen in this longitudinal section through the threaded spindle axis G that the core element 57 has an alternating disposal of convex and concave portions.

The core element 57 herein has a helically encircling groove 586 and a helically encircling protrusion 585. The thread tooth 581 preferably has a pitch, wherein the pitch of the thread tooth 581 is identical to that of the encircling groove 586, or identical to the pitch of the encircling protrusion 585, respectively. The thread tooth 581 herein is preferably configured in the region of the helically encircling protrusion 586 in the threaded element 58. In other words, the thread tooth 581 and the encircling protrusion are disposed so as to be mutually synchronous. The groove 586 and the protrusion 585 form form-fitting elements which when overmolding are embedded in the plastics material of the threaded element 58 and generate a connection which is form-fitting in the axial direction and the circumferential direction. A particularly stable and rigid assembly can thus be provided.

Figure 18:
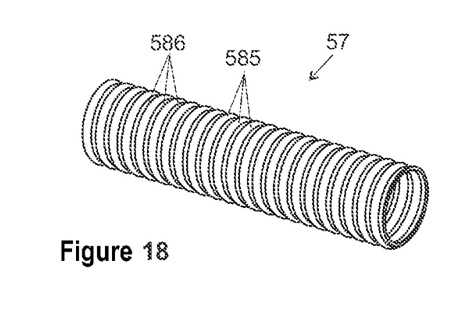
FIG. 18 is a perspective view of a core element according to FIG. 17.

The core element 57 according to FIG. 17 is illustrated in a perspective illustration in FIG. 18, wherein the core element 57 has a helically encircling groove 586 and a helically encircling protrusion 585. The encircling groove 586 and the encircling protrusion 585 are preferably configured in such a manner that said groove 586 and said protrusion 585 form an Edison screw fitting (lightbulb fitting) according to DIN 40400.

Figure 19:
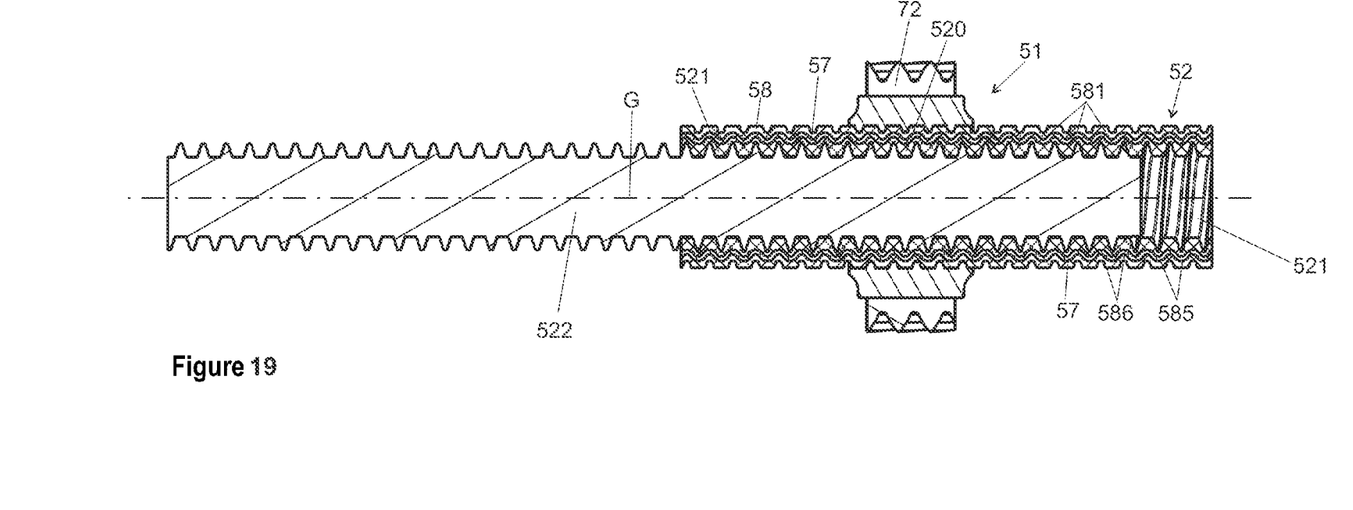
FIG. 19 is a longitudinal sectional view through a threaded spindle and a spindle nut of a still further example adjusting drive.

FIG. 19 shows a longitudinal section through a threaded spindle 52 and a spindle nut 51 of an adjusting drive 5 along the threaded spindle axis G in a fifth embodiment. This embodiment shows a refinement of an immersion spindle mechanism similar to the embodiment according to FIG. 17, in which the threaded spindle 52 has a threaded bush 520 having an internal thread 521 into which a second threaded spindle 522 is screwed, said second threaded spindle 522 at the free end thereof being able to be connected to the fastening element 54, as is known from the embodiment of FIGS. 13 and 14.

The internal thread 521 is configured in the threaded bush 520 which is formed from plastics material and which is injection-molded in the core element 57. The thread tooth of the internal thread 521 herein is configured so as to be synchronous with the groove 586, wherein the groove 586 in terms of the internal thread 521, thus when viewed from the inside, forms a protrusion. In other words, a groove on the external shell face of the core element 57 forms a protrusion on the internal shell face, or vice versa.

LIST OF REFERENCE SIGNS

1 Steering column
2 Support unit
21 Fastening means
22, 23 Pivot bearing
3 Actuating unit
31 Casing tube
32 Steering spindle
33 Fastening portion
34 Transmission element
4 Casing unit
41 Actuating lever
42 Passage opening
5, 6 Adjusting drive
51, 61 Spindle nut
52, 62 Threaded spindle
520 Threaded bush
521 Internal thread
522 Threaded spindle
53, 63 Bearing housing
54 Fastening element
541 Fastening bore
542 Fastening pin
55, 65 Drive motor
56, 66 Worm
57 Core element
571 Detent element
58 Threaded element
580 Detent element
581 Thread tooth
582 Flattening
583 Lubricant pockets
584 Form-fitting elements
59 Preloading element 591 Spring element
7 Gear wheel
71 Hub element
72 Toothing
73 Connecting portion
74 Internal thread
8 Bearing ring
81 Bearing face (Ball race)
91 Balls
92 Ball cage
93 Outer bearing rings
94 Counter bearing
L Longitudinal axis
H Height direction
G Threaded spindle axis

What is claimed is:

1. An adjusting drive for a steering column for a motor vehicle, the adjusting drive comprising:
a threaded spindle with a core element that at least in portions is coaxially surrounded in a fixed manner by a threaded element that is comprised of plastic and includes an external thread and a preloading element;
a spindle nut, wherein the external thread of the threaded spindle engages in the spindle nut, wherein the preloading element of the threaded element is elastically preloaded relative to a thread turn of the spindle nut; and
a drive motor that is coupled to the threaded spindle or the spindle nut such that driving at least one of the threaded spindle or the spindle nut causes the threaded spindle and the spindle nut to rotate relative to one another.

2. The adjusting drive of claim 1 wherein the threaded element is sleeve-shaped and arranged on the core element.

3. The adjusting drive of claim 1 wherein the threaded element is an injection-molded overmold.

4. The adjusting drive of claim 1 wherein the core element comprises metal.

5. The adjusting drive of claim 1 wherein a material of the core element has a higher thermal conductivity than the plastic of the threaded element.

6. The adjusting drive of claim 1 wherein the core element includes a form-fitting element that is connected in a form-fitting manner to the threaded element.

7. The adjusting drive of claim 1 comprising a gear wheel that is at least partially configured conjointly with the threaded element.

8. The adjusting drive of claim 1 wherein the preloading element includes a spring element that on the threaded element is configured to project in a helically encircling thread turn of the external thread.

9. The adjusting drive of claim 1 wherein the core element is tubular at least in portions.

10. The adjusting drive of claim 1 wherein the threaded spindle includes an internal thread.

11. The adjusting drive of claim 10 wherein the internal thread is configured in the core element or in the threaded element.

12. The adjusting drive of claim 1 wherein the core element or the threaded element includes a detent element.

13. The adjusting drive of claim 1 wherein the preloading element is an integral component of the threaded element that is comprised of plastic, with the preloading element being distinct from the external thread of the threaded element.

14. The adjusting drive of claim 13 wherein the preloading element presses an opposing tooth flank of an internal thread of the spindle nut such that the external thread of the threaded spindle is tensioned transversely to a helical extent of the external thread in the internal thread of the spindle nut to reduce or eliminate thread play between the threaded spindle and the spindle nut.

15. The adjusting drive of claim 1 wherein a diameter of the preloading element of the threaded element is less than a nominal diameter of the external thread of the threaded spindle.

16. The adjusting drive of claim 1 wherein at a circumferential location of the threaded spindle the preloading element extends axially across a plurality of thread turns of the external thread of the threaded element.

17. The adjusting drive of claim 1 wherein the preloading element is disposed at a discontinuity of the external thread of the threaded element.

18. The adjusting drive of claim 1 wherein the preloading element has two radially projecting leaf-shaped or finger-shaped spring elements that are spaced in an axial direction of the threaded spindle and in a circumferential direction of the threaded spindle.

19. A steering column for a motor vehicle comprising:
a support unit that is attachable to a body of the motor vehicle;
an actuating unit in which a steering spindle is rotatably mounted, with the actuating unit being held via the support unit;
an adjusting drive that includes a threaded spindle with a core element that at least in portions is coaxially surrounded in a fixed manner by a threaded element that is comprised of plastic and includes an external thread and a preloading element, wherein the external thread of the threaded spindle engages in a spindle nut, wherein the preloading element of the threaded element is elastically preloaded relative to a thread turn of the spindle nut, wherein the adjusting drive includes a coupling portion that is connected to the support unit or the actuating unit; and
a drive motor that is coupled to the threaded spindle or the spindle nut such that driving at least one of the threaded spindle or the spindle nut causes the threaded spindle and the spindle nut to rotate relative to one another.

20. A method for producing an adjusting drive that comprises a threaded spindle with external threads that engage in a spindle nut, a drive motor that is coupled to the threaded spindle or the spindle nut such that driving at least one of the threaded spindle or the spindle nut causes the threaded spindle and spindle nut to rotate relative to one another, wherein the threaded spindle includes a coupling portion, the method comprising:
providing a core element;
attaching a threaded element comprised of plastic to the core element to form the threaded spindle, wherein the threaded element includes a preloading element; and
screwing the threaded spindle into the spindle nut such that the preloading element of the threaded element is elastically preloaded relative to a thread turn of the spindle nut.

* * * * *